R. F. MASSEY.
CAR BRAKE.
APPLICATION FILED AUG. 31, 1910.

1,040,368.

Patented Oct. 8, 1912.

2 SHEETS—SHEET 1.

WITNESSES
Jas. K. McCathran
K. H. Riley

R. F. Massey, INVENTOR
BY
C. G. Siggers
ATTORNEY

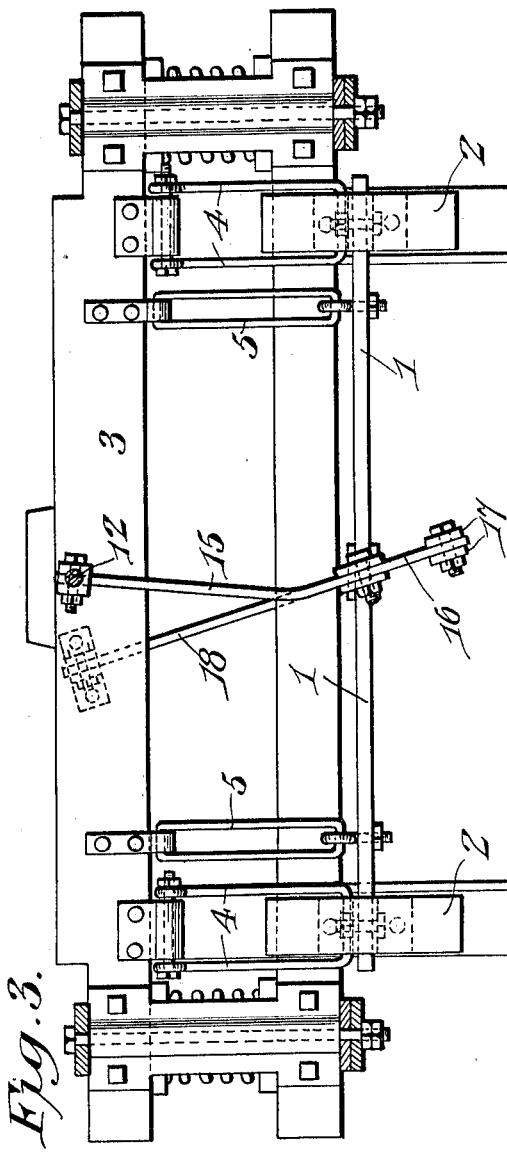

UNITED STATES PATENT OFFICE.

ROBERT FULTON MASSEY, OF TRUSSVILLE, ALABAMA, ASSIGNOR OF ONE-HALF TO PHIL S. MABE, OF TRUSSVILLE, ALABAMA.

CAR-BRAKE.

1,040,368.  Specification of Letters Patent.  Patented Oct. 8, 1912.

Application filed August 31, 1910. Serial No. 579,910.

*To all whom it may concern:*

Be it known that I, ROBERT F. MASSEY, a citizen of the United States, residing at Trussville, in the county of Jefferson and State of Alabama, have invented a new and useful Car-Brake, of which the following is a specification.

The invention relates to improvements in car brakes.

The object of the present invention is to simplify and improve the construction of car brakes, and to lessen the number of parts of the brake mechanism, and to enable car brakes to be mounted on cars with less labor and less expense.

A further object of the invention is to provided a car brake in which one of the floating levers usually employed will be dispensed with and the central brake rod connected directly to the brake lever at such end of the car, whereby a more direct application of the brakes at the expenditure of less amount of power is effected.

With these and other objects in view, the invention consists in the construction and novel combination of parts hereinafter fully described, illustrated in the accompanying drawings, and pointed out in the claim hereto appended; it being understood that various changes in the form, proportion, size and minor details of construction, within the scope of the claim, may be resorted to without departing from the spirit or sacrificing any of the advantages of the invention.

Figure 1:
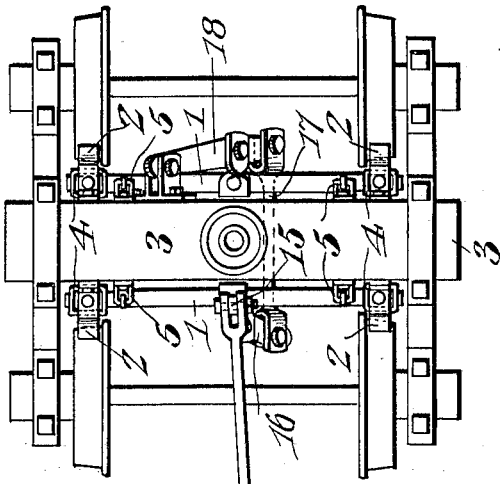
Figure 2:
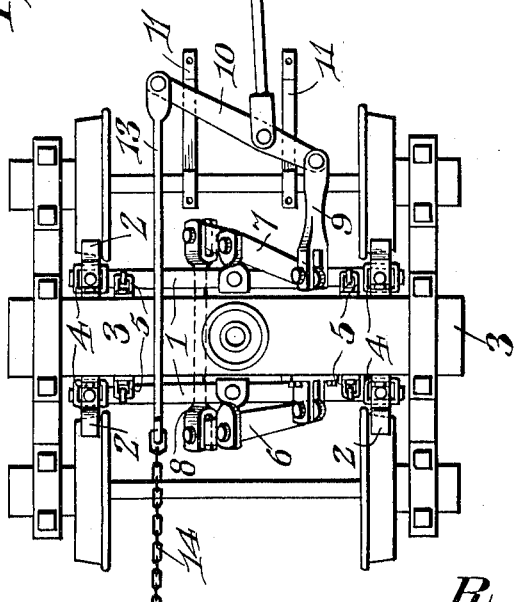
Figure 2:
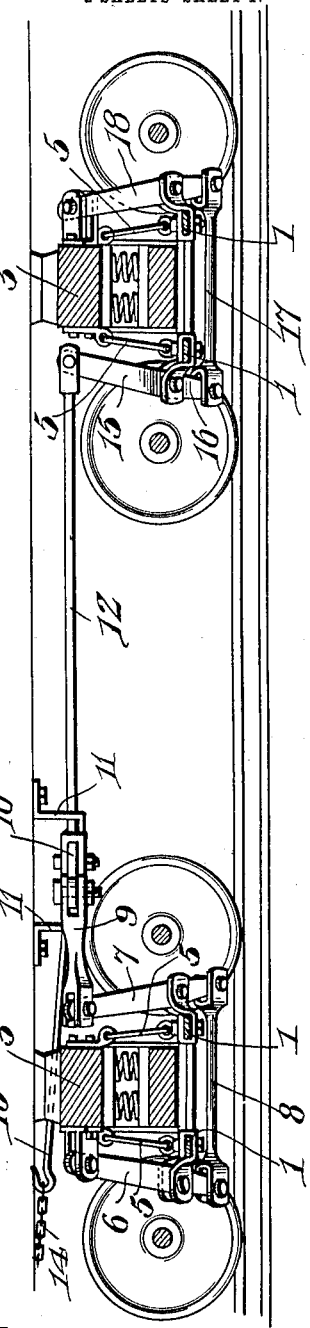

In the drawings—Figure 1 is a plan view of a car brake, constructed in accordance with this invention and shown applied to the trucks of a car. Fig. 2 is a side elevation of the same. Fig. 3 is a transverse sectional view, taken substantially on the line 3—3 of Fig. 1.

Like numerals of reference designate corresponding parts in all the figures of the drawings.

In the embodiment of the invention illustrated in the accompanying drawings, the brake beams 1 are equipped with brake shoes 2 and hung from the truck frames 3 by brake hangers 4, safety links 5 being also provided, as clearly illustrated in Fig. 3 of the drawings. The brake beams of one of the trucks are connected by brake levers 6 and 7 of the ordinary construction, fulcrumed at an intermediate point on the brake beams and connected at their lower arms by a lower brake rod 8. The dead lever 6 is connected at its upper end with the truck frame, and the live lever 7 is connected by a rod 9 with one arm of a floating lever 10, arranged in brackets 11 secured to the sills or other frame-work of the body of the car. The floating lever is connected at an intermediate point with a central brake rod 12, and its other arm is designed to be connected with the usual means for applying the car brake, a brake shaft connecting rod 13 and a brake shaft chain 14 only being shown. In practice the air brake equipment will also be connected with the floating lever 10, but as the brake mechanism is applicable to various types of cars and as any means may be employed for applying the brake, further illustration thereof is deemed unnecessary. The other end of the central brake rod 12 is connected directly to the upper arm of an angle brake lever 15, composed of a lower laterally inclined portion 16 and an upper centrally arranged approximately vertical portion, which is connected to the said brake rod 12. The lower inclined portion is pivoted to the inner brake beam and extends below the same and is connected by a lower brake rod 17 with a brake lever 18. The brake lever 18 is connected at an intermediate point with the outer brake beam, and its upper arm is connected with the truck. By connecting the central brake rod directly to the angle brake lever, the car brake dispenses with one of the floating levers together with its connections, and the brackets for mounting the same and the cost of the brake is lessened to that extent, and as there is a more direct application of power to the brake beams, the brake may be applied with less power than heretofore. Also one of the trucks may have worn shoes and the other may be equipped with new shoes without affecting the action of the brake. Also the direct connection between the central connecting rod and the angle brake lever changes the position of the former and arranges the same out of the way of the doors of dumping bottom cars.

Having thus fully described my invention, what I claim as new and desire to secure by Letters Patent, is:—

A car brake including brake beams arranged in pairs, brake levers also arranged in pairs and mounted on the brake beams, the members of each pair being connected with each other at their lower ends, and the inner brake lever of one pair being angular and consisting of a laterally inclined lower portion, and a centrally arranged upright upper portion bent into line with the king bolt of the truck, a single floating lever connected at one end with the inner end of the brake lever of the other pair at one side of the portion bent into line with the king bolt of the truck, a single floating lever connected at one end with the inner one of the brake levers of the other pair at one side of the central line of the car, operating mechanism connected with the other end of the floating lever, a centrally arranged brake rod connected at one end to and extending from the floating lever at a point intermediate of the ends thereof and connected at the other end to the upper end of the angular brake lever, whereby only a single floating lever is necessary, and means for connecting the upper ends of the outer brake levers of each pair with the trucks of the car.

In testimony, that I claim the foregoing as my own, I have hereto affixed my signature in the presence of the witnesses.

ROBERT FULTON MASSEY.

Witnesses:
J. M. ACTON,
H. H. $\times$ COX,
    his
    mark
PAUL MARTIN.

---

Copies of this patent may be obtained for five cents each, by addressing the "Commissioner of Patents, Washington, D. C."